March 21, 1944.  J. P. RATHBUN  2,344,898
LIQUID SEPARATING APPARATUS
Filed June 12, 1941  2 Sheets-Sheet 1

WITNESSES:

INVENTOR
JOHN P. RATHBUN.
BY
ATTORNEY

March 21, 1944. J. P. RATHBUN 2,344,898
LIQUID SEPARATING APPARATUS
Filed June 12, 1941 2 Sheets-Sheet 2

WITNESSES:

INVENTOR
JOHN P. RATHBUN
BY
ATTORNEY

Patented Mar. 21, 1944

2,344,898

UNITED STATES PATENT OFFICE 2,344,898

LIQUID SEPARATING APPARATUS

John P. Rathbun, Prospect Park, Pa., assignor to Westinghouse Electric & Manufacturing Company, East Pittsburgh, Pa., a corporation of Pennsylvania Application June 12, 1941, Serial No. 397,747

1 Claim. (Cl. 183—84)

This invention relates to separating apparatus, more particularly to separators adapted to remove liquid from a gaseous fluid, and has for an object the provision of improved appratus of this character.

Another object of the invention is the provision of a two-stage separator so arranged that the amount of separation occurring in each stage thereof may be controlled.

These and other objects are effected by the invention as will be apparent from the following description and claim taken in connection with the accompanying drawings forming a part of this application, in which:

Figure 1:
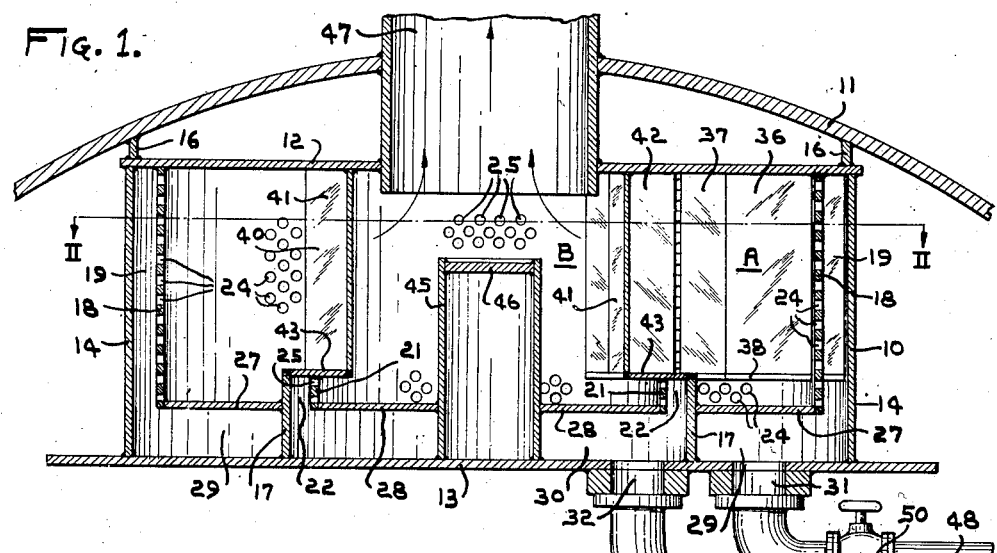
Fig. 1 is a vertical sectional view taken along the line I—I of Fig. 2, looking in the direction of the arrows.

Referring now to the drawings more in detail, there is shown at 10 a two-stage separator adapted for use with various types of apparatus, for example, an evaporator 11, the separator 10 being positioned adjacent the top of the evaporator, as shown in Fig. 1. The separator 10 comprises an outer case defined by top and bottom walls 12 and 13, respectively, joined by an annular side wall 14. This casing may be secured to the apparatus with which it is used, in this case the shell of the evaporator 11, by suitable means, for example, the members 16.

The interior of the casing is divided into first and second stages A and B, respectively, by an inner annular member 17 extending from the top wall 12 to the bottom wall 13. Preferably, the outer annular wall 14 and the inner annular member 17 are concentrically disposed.

Within the space constituting the first stage A there is disposed a directing and separating member 18 in the form of an annular wall concentric with and spaced slightly from the outer annular wall 14 and defining therebetween an annular space 19 for downward flow of liquid. A similar annular directing and separating member 21 is positioned within the space defining the second stage B, in concentric and spaced relation to the inner annular member 17, and defines therebteween a space 22 for flow of liquid. The annular directing and separating members 18 and 21 are provided with a large number of openings 24 and 25, respectively, for a purpose to be hereinafter explained.

The lower edges of the annular separating members 18 and 21 terminate in spaced relation to the bottom wall 13 of the outer casing and have associated therewith bottom closures 27 and 28, respectively, extending radially inwardly from the lower edges thereof to the annular members 17 and 45, respectively. The closure members 27 and 28, in cooperation with the bottom wall 13 of the outer casing, provide therebetween fluid collection spaces 29 and 30, respectively, the collection space 29 being in communication with the space 19 and the collection space 30 being in communication with the space 22. The spaces 29 and 30 are provided with liquid discharge openings 31 and 32, respectively.

Passages 35 are provided for the flow of fluid to the first stage A of the separator and are defined by vertical side wall members 36 and 37 and bottom members 38, the top of the passages being defined by the top wall 12 of the separator casing. Preferably, these passages are so arranged that the fluid passing therethrough enters the space A substantially tangentially to the annular directing and separating member 18.

In like manner, passages 40 are provided for the flow of fluid from the first stage A to the second stage B, these passages being defined by vertical side wall members 41 and 42, a bottom member 43 and the top wall 12 of the separator casing. Preferably, these passages 40 also provide for tangential entry of fluid to the second stage B.

Tangential entry of the fluid to the various stages of the separator provides for circular or spiral flow of the fluid through the apparatus. To further this objective, there is provided at the center of the second stage B a concentrically positioned structure comprising an annular wall 45, closed at its top by suitable means, such as the plate 46. An outlet 47 is provided from the top of the second stage B to the exterior of the separator.

In operation, fluid, for example steam, containing particles of liquid passes through the openings 35 to the first stage A of the separator, where it passes circumferentially or spirally along the inner surface of the perforated member 18 with the result that centrifugal force causes the particles of moisture or liquid carried thereby to be thrown radially outwardly through the perforations 24, the liquid passing downwardly in the space 19 to the collection space 29, and the steam continuing through the openings 40 to the second stage B of the separator where the separating action is repeated as the steam passes spirally or circumferentially along the inner surface of the perforated annular member 21 and the moisture thrown out of the stream of fluid and through the perforations 25 by centrifugal force passes downwardly in the space 22 to the collection chamber 30. The fluid from which the liquid has been removed exhausts through the discharge opening 47.

It will be noted that the construction assures that steam passing to the second stage B is drawn from the innermost portion of the first stage A, where the liquid content of the steam is lowest. Thus, the driest possible steam is discharged from the separator.

While under some conditions it may be satisfactory to have the two liquid collection chambers 29 and 30 in communication or formed as a single chamber with a single outlet, it is frequently preferable to make use of the separated construction herein illustrated and to provide independent liquid exhaust conduits 48 and 49 for the discharge openings 31 and 32, respectively. In this arrangement the conduits 48 and 49 are provided with valves 50 and 51, respectively, whereby the flow of liquid and/or gas therethrough may be regulated. With such an arrangement, and with the conduits 48 and 49 in communication with a region of lower pressure than that existing within the separator, the relative amounts of separation performed by each stage of the separator may be controlled, thereby obtaining maximum efficiency of the separator as a whole.

Figure 2:
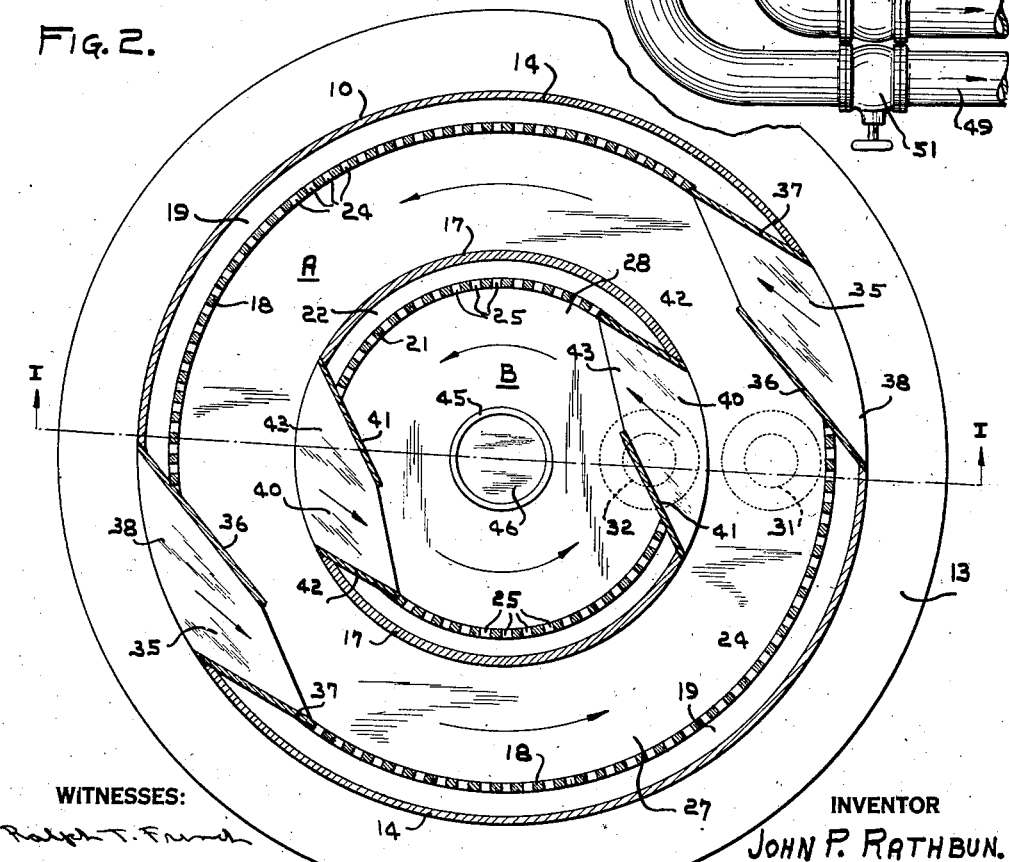
Fig. 2 is a horizontal sectional view taken along the line II—II of Fig. 1, looking in the direction of the arrows.
Figure 3:
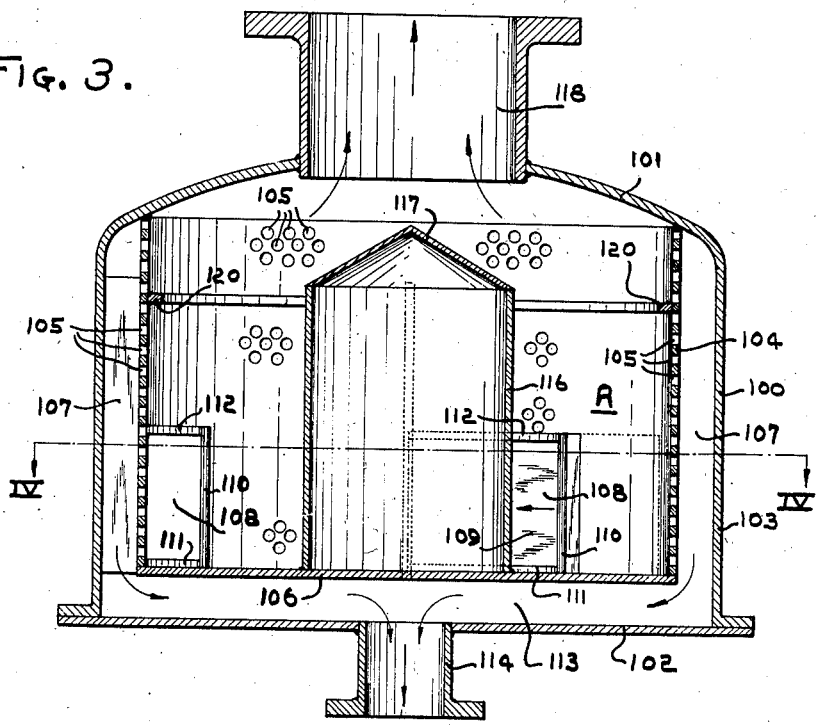
Fig. 3 is a view similar to Fig. 1, but showing a modification of the invention and is taken along the line III—III of Fig. 4, looking in the direction of the arrows; and, Fig. 4 is a view similar to Fig. 2 taken along the line IV—IV of Fig. 3, looking in the direction of the arrows.
Figure 4:
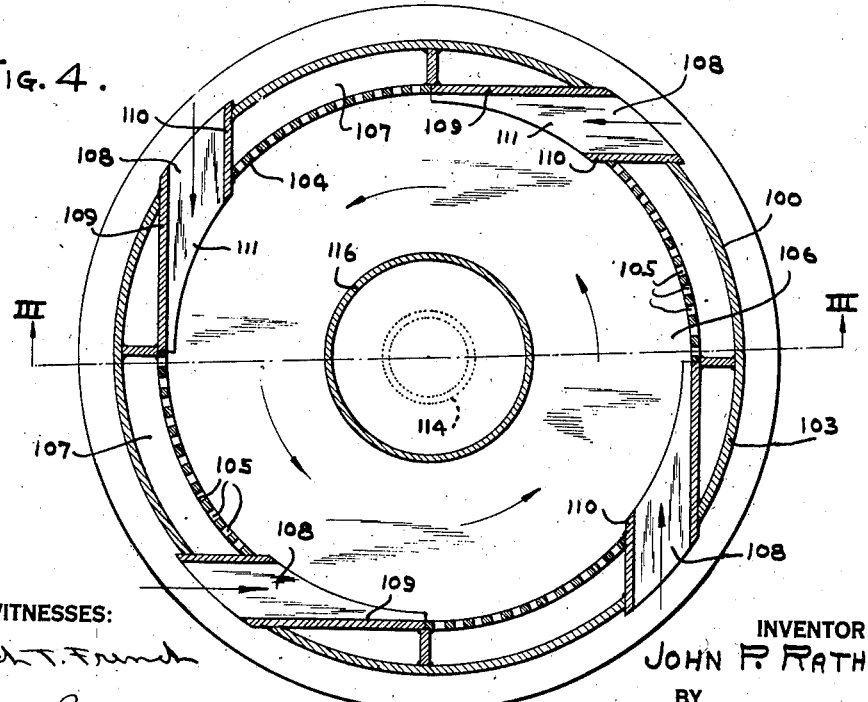

In Figs. 3 and 4 there is illustrated a further modification of the invention wherein the structure is substantially similar to that of Figs. 1 and 2 except that only one stage is provided instead of two. In this modification there is shown a separator 100 comprising a top wall 101 and a bottom wall 102 joined by an annular side wall 103. An inner annular perforated member 104 is arranged interiorly of and concentric to the annular side wall member 103, and is spaced therefrom to provide a liquid flow space 107 in communication with a liquid collection space 113, the latter having an outlet 114. A horizontal plate 106 cooperates with the lower edge of the inner annular member 104 to prevent by-pass of steam or other fluid about the lower edge of the perforated member.

A plurality of passages 108, defined by side walls 109 and 110 and bottom and top walls 111 and 112, respectively, provide for admission of fluid tangentially of the perforated annular plate 104. The operation of this separator is similar to that of the arrangement shown in Figs. 1 and 2, the fluid entering through the passages 108 and flowing spirally or circumferentially of the inner surface of the perforated annular member 104. Centrifugal action causes moisture carried by the fluid to be thrown out through the perforations 105 where it flows through the space 107 to the liquid collection space 113. An inner cylindrical member 116, disposed concentrically with respect to the annular members 103 and 104, and provided with a cap or top closure 117, aids in maintaining spiral flow of fluid through the apparatus, the fluid finally exhausting through the outlet 118 at the top of the separator.

Under some conditions of operation, and more particularly in single stage separators, it may be desirable to provide means for preventing undue rise of liquid along the inner surface of the annular separating member 104, and to this end there is illustrated in Fig. 5 an annular lip 120 provided on the inner surface of the annular member 104 adjacent the upper edge thereof to materially limit upward movement of liquid therealong.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claim.

What is claimed is:

A separator for removing liquid from a gaseous fluid; comprising top and bottom walls joined by an annular side wall; horizontal baffle structure dividing the space enclosed by said walls into an upper separating space and a lower liquid-collecting space; a liquid outlet from said collection space at the bottom thereof; a fluid outlet from the separation space through the top wall adjacent the center thereof and spaced radially inward a material distance from said annular side wall; means for delivering gaseous fluid to the separation space with a whirling movement, the annular side wall serving to direct and maintain the whirling movement of the fluid and having a plurality of perforations therethrough for discharge of liquid therethrough by centrifugal force acting on the whirling fluid; and means for conducting the discharged liquid to the liquid collection space.

JOHN P. RATHBUN.